April 10, 1934.   W. CLARK ET AL   1,954,774
FUEL DISTRIBUTING MECHANISM
Filed Aug. 6, 1930   2 Sheets-Sheet 1
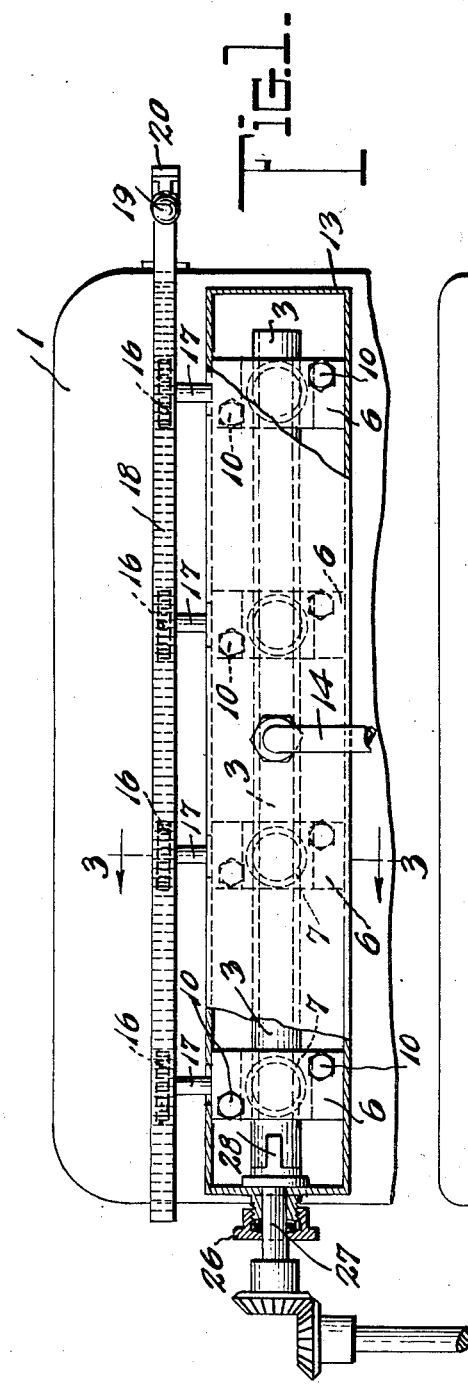
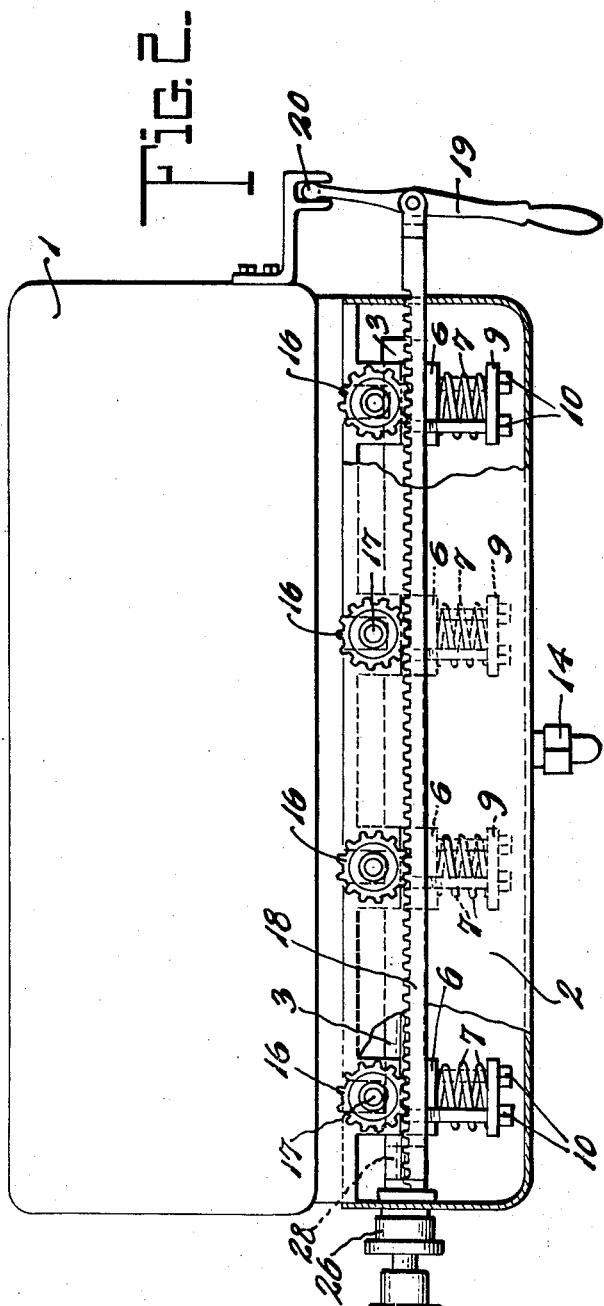

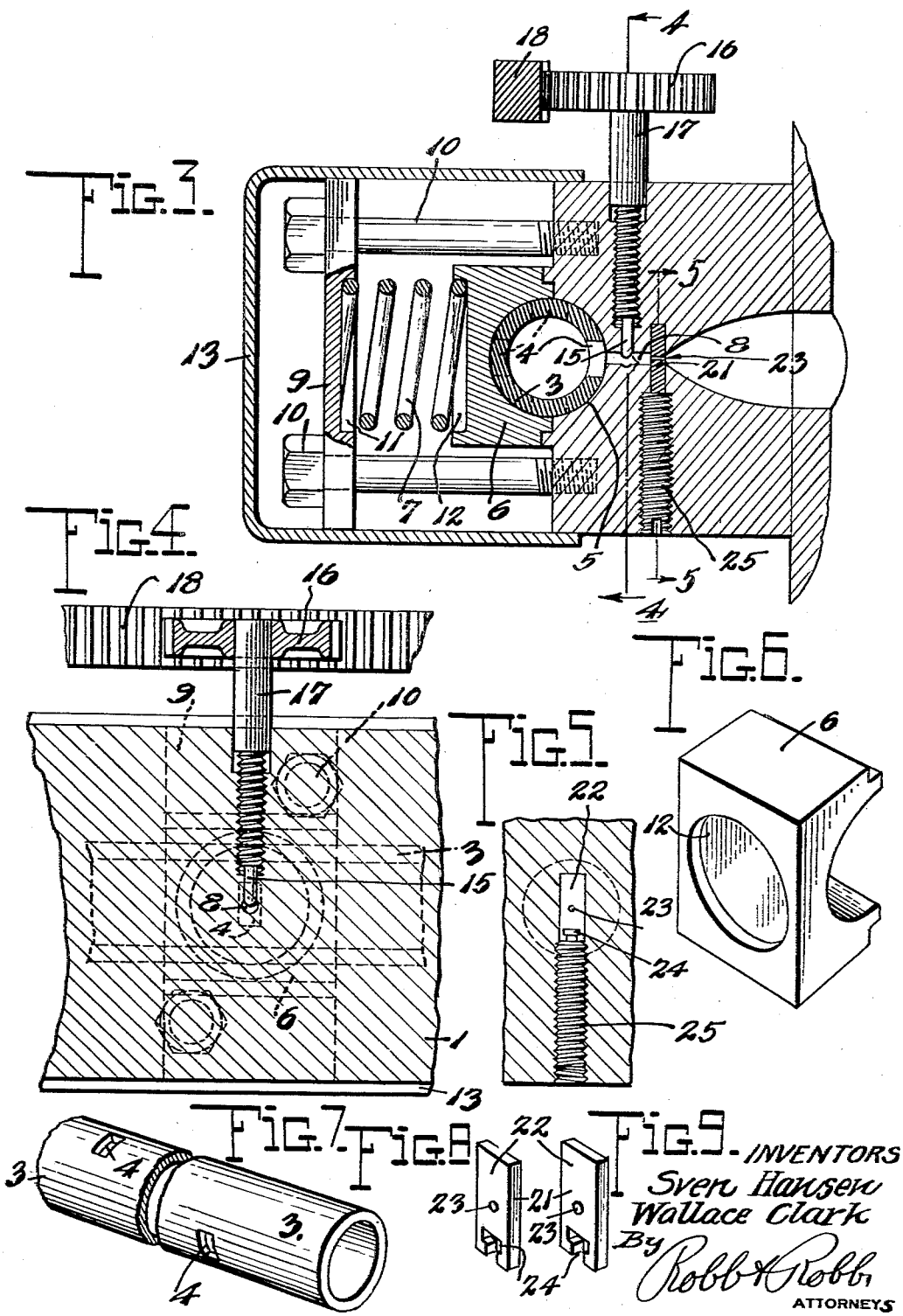

Patented Apr. 10, 1934

1,954,774

UNITED STATES PATENT OFFICE 1,954,774

FUEL DISTRIBUTING MECHANISM

Wallace Clark, Indianapolis, Ind., and Sven Hansen, Cleveland, Ohio

Application August 6, 1930, Serial No. 473,447

4 Claims. (Cl. 123—59)

This invention relates to internal combustion engines, and more particularly to fuel distribution mechanisms therefor which are especially adaptable for use in conjunction with liquid fuel, or what are commonly called solid fuel, types of combustion engines.

In the usual fuel distribution mechanisms, and particularly those employing springs for controlling the injection of the fuel, the speeds of the engine are limited owing to the inability of the springs and associated parts to perform their functions with sufficient rapidity beyond a certain range. The fuel pressure to which the parts are subjected, also has a material effect on the attainable speed to further limit the same.

The present invention has for an object to provide a means for accurately distributing, injecting, metering, and timing of the fuel which permits greater ranges of speed to be obtainable than has been possible heretofore.

A further object of the invention is to provide a rotary valve mechanism wherein the fuel is introduced into the combustion chambers of the engine under pressure in such a manner as to balance the said rotary valve.

Another object of the invention is to yieldably mount the valve to insure close engagement of the same with the valve seats, the yieldable mounting automatically taking up wear.

A still further object of the invention is to enclose the valve mechanism by a suitable casing, into which the fuel under pressure is introduced, said fuel to be conducted from the casing interiorly of the valve into the combustion chambers, thereby effectively lubricating the valve mechanism and affording a balanced valve, the pressures interiorly and exteriorly thereof being substantially the same.

Other and further objects and advantages of the invention will be hereinafter set forth and the novel features thereof defined by the appended claims.

In the drawings:

Fig. 1 is a view in elevation of our improved fuel distributing mechanism as applied to a conventional internal combustion engine, parts being broken away and shown in section;

Fig. 2 is a top plan view of the mechanism shown in Fig. 1, parts being broken away and shown in section;

Fig. 3 is a sectional view of the fuel distributing mechanism taken on the line 3—3 of Fig. 1;

Fig. 4 is a fragmentary detail sectional view taken on the line 4—4 of Fig. 3;

Fig. 5 is a fragmentary detail sectional view taken on the line 5—5 of Fig. 3;

Fig. 6 is a perspective view of the movable bearing member;

Fig. 7 is a fragmentary detail perspective view of the rotary valve;

Fig. 8 is a detail perspective view of the removable nozzle or jet; and

Fig. 9 is a perspective view similar to Fig. 8, showing a jet or nozzle of a different size.

Like reference characters designate corresponding parts in the several figures of the drawings.

Referring particularly to Figs. 1 and 2, 1 denotes diagrammatically a conventional internal combustion engine having the fuel distributing mechanism, designated generally by the reference character 2, applied thereto. This mechanism preferably comprises a rotary cylindrical valve 3 having suitable ports 4 formed therein at spaced points in the length thereof and properly displaced about the periphery of the valve relative to each other to establish communication with the combustion chambers of the engine in the usual sequence. The valve 3 is seated in a semicircular recess 5 formed at one side of the engine to constitute a stationary bearing section. Movable bearing sections 6, yieldably maintained in engagement with the valve by suitable compression springs 7, are positioned at intervals in the length of the valve and preferably equal in number to the number of cylinders. To keep the ports 4 closed at all times, except when in direct communication with the passage 8 through the stationary bearing, the movable bearing blocks are located directly opposite the ports.

The compression springs 7 are preferably provided with a suitable means permitting an adjusting of the compressive action of the same, as, for example, by plates 9 spaced from the valve bearings and provided with suitable adjusting bolts 10 extending therethrough and having threaded engagement with the stationary bearing sections, the compression springs being located intermediate the plates 9 and the movable bearing sections 6 and having recesses 11 and 12 therein respectively for receiving the ends of the said springs. Obviously, any suitable adjusting means might be provided and any number of bolts for compressing or releasing the springs might be employed, but we have shown a pair of bolts for each plate extending through the same at opposite corners as the preferred construction.

The distributing mechanism hereinbefore described is suitably enclosed by a casing or housing 13, into which the fuel is introduced under pressure from the source of supply through the inlet 14, the casing constituting a fuel pressure chamber. The fuel in this chamber is conducted to the valve 3 in any desired manner, as, for example, by terminating the end of the valve short of the end of the casing and leaving the said end of the valve open to enable the fuel to flow thereinto longitudinally of the valve.

By enclosing the distributing mechanism in this manner, two distinct main advantages over the constructions heretofore known are obtained. First, the fuel in the pressure chamber about the valve mechanism will continuously lubricate the same and minimize wear. Second, a balanced valve is provided, the pressures interiorly and exteriorly thereof being substantially the same. This latter advantage is very important by reducing the tendency of the valve to leave the seats incident to the rotation of the ports out of communication with the passages 8. In addition to these advantages, the fuel in the casing 13 will act as a cooling medium for the distributing mechanism, the heat being absorbed by the said fuel and utilized to increase the overall efficiency of the engine.

Preferably located intermediate the cylindrical valve and the combustion chambers are adjustable needle valves 15 for controlling the quantity of fuel injected into the engine, there being preferably a needle valve for each cylinder. Any suitable means for controlling the needle valves may be provided, as, for example, by the pinions 16 secured on the shanks 17 of the needle valves, said pinions engaging a toothed rack 18 adapted to be reciprocated by a control lever 19 pivotally connected to the engine at 20, thereby permitting a simultaneous adjustment of all of the needle valves.

A suitable nozzle or jet 21 is also preferably employed, such a jet being preferably removable. A plate 22 having a restricted opening 23 therethrough, the plate being swivelly connected at 24 to a screw or plug 25 for permitting insertion and removal of the plates, serves the function of a jet in an excellent manner.

Rotation of the cylindrical valve 3 may be accomplished in any desired manner, as, for example, by driving the same through suitable gears and shafts actuated by the crank shaft or other rotating part. A packing gland 26 prevents leakage of the fuel from the casing 13 around the extension shaft 27 extending through the casing and suitably splined to the valve 3, as at 28.

The operation of the distributing mechanism should be apparent from the foregoing description, and it will be seen that it serves to accurately distribute, inject, meter, and time the fuel without the use of spring controlled reciprocating parts, the objections to which have been hereinbefore pointed out.

While the specific details of construction have been herein shown and described, the invention is not confined thereto as changes and alterations may be made without departing from the spirit thereof as defined by the appended claims.

Having thus described our invention, what we claim as new and desire to secure by Letters Patent is:

1. In a solid fuel internal combustion engine, a solid fuel distributing mechanism therefor comprising an elongated cylindrical valve having spaced ports therein adapted to communicate with the combustion chambers of the engine, yieldable bearing means for said valve, a casing enclosing said valve and bearing means and constituting a fuel pressure and heating chamber and lubricating means for the valve, said chamber being in communication with the interior of said cylindrical valve, and means for rotating said valve to effect an injection of the fuel into said combustion chambers.

2. In an internal combustion engine having a plurality of cylinders, an elongated rotary cylindrical valve having spaced ports therein adapted to communicate with the said cylinders at intervals in the rotation thereof, a plurality of yieldable bearings for said valve, said bearings being equal in number to the number of cylinders and positioned opposite the said ports in the valve, and a casing enclosing said bearings and valve and constituting a fuel pressure and heating chamber, said chamber being in communication with the said valve for directing the fuel longitudinally through the valve and equalizing the pressures interiorly and exteriorly thereof.

3. In an internal combustion engine, a rotary valve for controlling the admission of fuel to the combustion chamber of said engine, bearing blocks resiliently engaging said rotary valve, a heating and pressure chamber encasing the valve gear, means for conducting a solid fuel under pressure to the combustion chambers of the engine exteriorly and interiorly of said rotary valve, and separate means intermediate said rotary valve and each of the said combustion chambers for controlling the quantity of solid heated fuel injected.

4. In an internal combustion engine including combustion chambers, a rotary valve gear for controlling the admission of a solid fuel to said chambers, bearing blocks resiliently engaging said valve, a heating and pressure chamber encasing said valve gear and blocks, means for conducting the fuel under pressure to the combustion chambers of the engine exteriorly and interiorly of said rotary valve, and separate adjustable means intermediate said valve gear and each of said combustion chambers for adjustably controlling the quantity of solid heated fuel injected into said combustion chambers under control of said rotary valve, and means for simultaneously controlling all of said adjustable means.

SVEN HANSEN.
WALLACE CLARK.